Dec. 3, 1940.   H. W. KOST   2,223,622
TRIM FASTENER
Filed Aug. 15, 1939
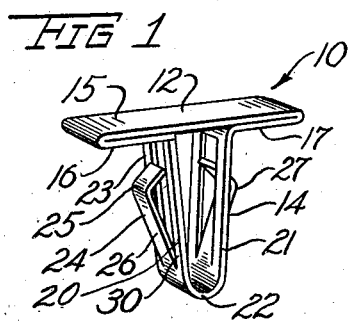
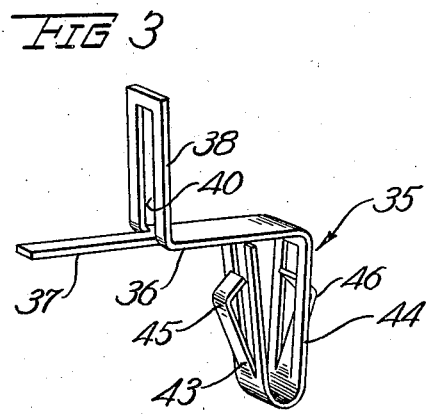
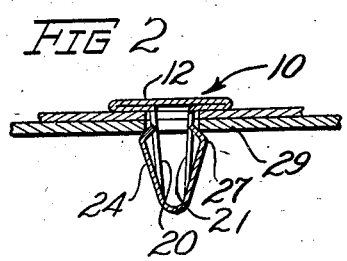
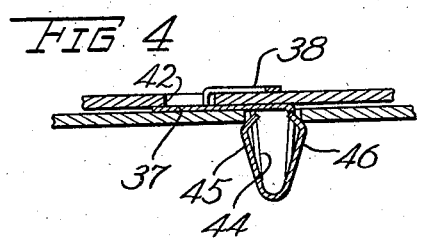
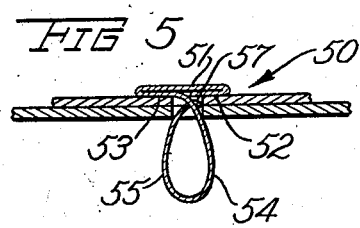
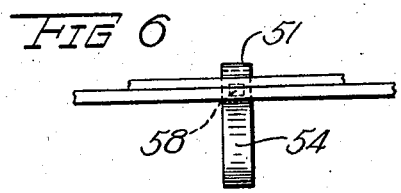
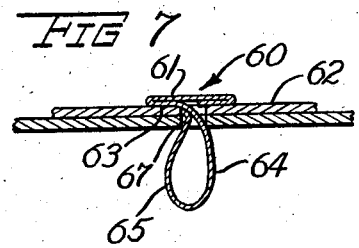
INVENTOR
Harold W. Kost
BY
ATTORNEY Patented Dec. 3, 1940

2,223,622

UNITED STATES PATENT OFFICE 2,223,622

TRIM FASTENER

Harold W. Kost, Birmingham, Mich., assignor to Detroit Harvester Company, Detroit, Mich., a corporation of Michigan Application August 15, 1939, Serial No. 290,255

10 Claims. (Cl. 24—73)

This invention relates to improvements in snap fasteners, and is particularly, though not exclusively, directed to a trim fastener adapted for removably positioning upholstery or trim in vehicle bodies, or the like.

An object of the invention is to provide a trim fastener of this character having a trim engaging and supporting portion, and a stud portion provided with snap fastening means adapted to be inserted in an aperture in a panel, or like support, for retaining the trim in position with respect to such support.

Another object of the invention is to provide a fastener with integral snap fastener means in the form of fingers formed entirely of the material of the fastener to produce in effect a multipart fastener from a single strip of sheet metal.

A further object of the invention is to provide a snap fastener with an integral resilient finger, or aperture engaging arm, permitting ready installation in an aperture in a panel, or the like, and at the same time providing a substantially permanent attaching means for the trim.

Further objects and advantages will become apparent from a study of the following description when taken in connection with the accompanying drawing, in which:

Figure 1 is a perspective view illustrating a form of trim fastener embodying the present invention;

Figure 2 is a vertical sectional detail view illustrating the fastener of Figure 1 in use;

Figure 3 is a view similar to Figure 1, illustrating a modified form of the invention;

Figure 4 is a view similar to Figure 2, but illustrating the fastener of Figure 3;

Figure 5 is a vertical sectional detail view illustrating a still further form of the invention;

Figure 6 is an elevational view of the fastener shown in Figure 5; and

Figure 7 is a view similar to Figure 5, but illustrating a still further form of the present invention.

Referring to the drawing, and particularly to the embodiment of the invention illustrated in Figures 1 and 2, a trim fastener, indicated generally at 10, comprises a head portion 12 and a depending stud or body portion 14. The fastener is preferably formed from a single strip of sheet metal of suitable characteristics, such as spring steel, or the like. The head portion has a generally flat top 15, at one end of which is located a substantially parallel arm 16 bent back upon itself and into engagement with the lower surface of the top 15. The other end of the top is likewise bent back upon itself to form an arm 17 from which the stud or body portion 14 depends.

Stud portion 14 comprises a pair of comparatively rigid leg portions 20 and 21 interconnected by an intermediate portion 22 remote from the head 12. The leg 20 has its free end portion 23 disposed adjacent the head 12, the other leg 21 being integrally connected to an arm of the head. The leg portions 20 and 21 are slightly angularly disposed and converge toward the intermediate or connecting portion 22, and each leg has a yieldable snap fastener means formed therein. The snap fastener means or members comprise a pair of fingers 24 having diverging portions 25 and converging portions 26 providing shoulders at 27 for engagement with the cooperating apertured part or panel 29, as shown in Figure 2. The fingers 24 are connected together by the connecting portion 22 of the legs 20 and 21 to form a nose or leading edge on the stud for guiding the latter into engaging relation with the aperture. The other ends of the fingers are free and are disposed adjacent the head portion but spaced therefrom to provide for the reception of the panel and trim material. Thus the fastener comprises a single piece of material in which is formed the head as well as the stud portion, and the particular arrangement illustrated provides a rigid positive fastening means for the trim.

In Figures 3 and 4, an alternate form of trim fastener has been illustrated in which the fastener indicated generally at 35, comprises a head portion 36 having a trim engaging finger 37 and a trim engaging arm 38 adapted to be bent back upon itself into parallelism with the head 36 to embrace a portion of the trim therebetween, as particularly shown in Figure 4. The trim engaging finger and arm has been illustrated as formed out of the same end portion of the head, the finger 37 being stamped out of the arm and producing an aperture 40 as a result of taking material from the end portion of the head for forming the finger. The arm 38 is preferably bent upwardly for insertion in an aperture 42 in the trim material, the arm 38 being subsequently bent back upon itself to embrace one face of the trim. The stud or body portion of the fastener 35 is similar to that described in connection with the fastener illustrated in Figures 1 and 2, and is connected to the head by a connector wall 36a. It comprises a pair of arms 43 and 44 provided with spring fingers 45 and 46 respectively in the arms and arranged in a like manner to those of Figures 1 and 2.

The form of the invention illustrated in Figures 5 and 6 comprises a trim fastener 50 having a head portion 51, one end of which is bent back upon itself to form a substantially parallel arm 52 engageable with the trim material, as in the previously described forms of the invention. Another arm 53, also parallel to the top portion 51, is formed at the other end thereof, from which arm a stud portion 54 depends. Stud portion 54 is bent back upon itself at a point remote from the head portion to form a loop having an upwardly extending arm 55, the upper extremity of which is reduced in width and provides a lip or tongue 57 receivable in an opening 58 in stud portion 54 adjacent the head. The opening 58 is of a size to permit relative movement of the lip 57 therein, in order that the stud portion 54 may be inserted through an aperture in a panel or like support. It will be noted that the form of fastener shown in Figures 5 and 6 is fabricated from a single strip of comparatively narrow sheet material providing an integral structure having a trim engaging head portion and a depending stud portion arranged to be snapped into fastening engagement with the walls of a suitable aperture.

In Figure 7, a slightly modified form of fastener from that shown in Figures 5 and 6, has been illustrated as comprising a unitary fastener structure indicated generally at 60. The fastener 60 includes a head portion 61 provided with inturned arms 62 and 63 arranged parallel to the top face of the head. From one arm 63 extends a stud portion 64, bent back upon itself to provide an upwardly extending arm or leg 65 terminating in a slightly outwardly extremity or lip 67. It is to be noted that in this form of the invention the lip 67 lies adjacent the juncture of the arm 63 and the stud portion 64, and is arranged so that upon insertion in a suitable aperture, relative movement between the lip and the stud 64 is permitted. Thus, during installation it will be noted that the stud portion is compressed, and being of suitable resilient material, expands into engagement with the aperture to securely retain the fastener in position and thus hold the trim or upholstery material in its desired position.

Heretofore fasteners of this type have been formed with open ends on the holding arms and these are sharp and sometimes cause lacerations to the fingers of those who are engaged in assembling these fasteners. Many times in assembling fasteners with open ends, one side of the clip impinges upon a side of the hole through which the clip is to be assembled and the operator, in trying to force the clip through the hole, flattens one leg of the clip, thereby making it necessary to insert a new fastener and start all over. These difficulties are overcome in the above fastener which provides a smooth entering surface comprised of the U-shaped connector wall 22, thereby allowing the clip to enter the hole easily and precluding any possibility of finger lacerations or the flattening of one leg of the clip as described above. The fastener represented by Figures 3 and 4 has an added advantage in that the arm 37 extends back and under the panel so that when the clip is pulled down into the aperture in which it is to be assembled, the head or U-shaped portion of the clip can not tilt, but lies in substantially the same plane as it occupied before being inserted into the aperture.

It will be apparent also that various modifications other than those herein shown and described, may be made in the structure without departing from the spirit of the invention.

What I claim is:

1. A trim fastener comprising a unitary body of sheet material of uniform width having a head, a pair of arms substantially in alignment with one another and connected at one end to opposite ends of said head and longitudinally contiguous therewith, a stud depending from one of said arms and having its lower extremity rounded to provide a smooth entering surface for the fastener, and an upwardly extending leg terminating below said head.

2. A trim fastener comprising a head having a pair of arms substantially parallel to said head and connected at one end thereto, and a U-shaped stud depending from one of said arms and having a free end terminating adjacent the inner end of the other of said arms.

3. A trim fastener comprising a unitary body having a head, arms connected to opposite ends of said head and substantially parallel thereto, a stud depending from one of said arms, said stud having its lower extremity rounded to provide a smooth entering surface for the fastener, and a leg of the stud terminating adjacent the inner end of the other of said arms.

4. A trim fastener comprising a unitary body of sheet material having a head, a pair of arms substantially in alignment with one another and connected at one end to said head and contiguous therewith, a stud depending from one of said arms, said stud having a pair of legs connected remote from said head by a rounded connector wall to provide a smooth entering surface for the fastener and one of said legs terminating adjacent said other leg, a pair of fingers struck from each of the legs respectively and resiliently projecting therefrom, and a shoulder formed in each of said fingers to provide snap fastening means.

5. A trim fastener comprising a head having a pair of arms folded back under said head and parallel thereto, a stud depending from one of said arms and having a pair of legs connected remote from said head by a rounded connector wall to provide a smooth entering surface for the fastener, and a pair of diverging and converging fingers struck from each leg respectively and resiliently projecting therefrom to provide snap fastening means, said fingers terminating below and spaced from said arms.

6. A trim fastener comprising a unitary body of sheet material having a head, a trim engaging finger and an arm substantially parallel to one another when in fastening position and integral at one end to said head and engageable with opposite sides of the trim, a stud connected to said head through a connector wall and depending therefrom at substantially a right angle, said stud having a pair of legs interconnected remote from said head by a rounded connector wall to provide a smooth entering surface for the fastener, and a finger projecting from each of said legs with its free end disposed below said head, and a shoulder formed in each of said fingers to provide snap fastening means.

7. A trim fastener comprising a head having a trim engaging finger and an arm connected at one end to said head, a stud connected through a connector wall portion to said head and depending therefrom, said stud having a pair of legs interconnected remote from said head by a rounded connector wall to provide a smooth entering surface for the fastener, and a converging and diverging finger struck from the material of each leg and resiliently projecting therefrom to provide snap fastener means, said fingers terminating short of said head.

8. A trim fastener comprising a unitary body having a head for engagement with one side of the trim material, an arm connected at one end and folded back upon to said head for engagement with the other side of the trim material, a finger struck from said arm and extending substantially in alignment with said head, a stud connected through a connector wall portion to said head and depending therefrom, said stud having a pair of legs interconnected remote from said head by a rounded connector wall to provide a smooth entering surface for the fastener, and a finger struck from each of said legs and resiliently projecting therefrom to form snap fastener means.

9. A trim fastener comprising a head having a pair of arms folded back beneath said head and contiguous therewith, a stud depending from one of said arms and bent back upon itself at a point remote from said head to form a loop having an upwardly extending leg, a lip on the free end of said leg, and an opening in said stud adjacent said head for receiving said lip.

10. A trim fastener comprising a unitary body having a head, a pair of arms substantially in alignment with one another and connected at one end to said head, and a stud depending from one of said arms and folded back upon itself at a point remote from said head to form a loop, said stud terminating in a free end abutting said stud adjacent said head.

HAROLD W. KOST.